United States Patent
Ahn et al.

(10) Patent No.: US 8,725,067 B2
(45) Date of Patent: May 13, 2014

(54) SELF-INTERFERENCE CANCELLATION METHOD AND APPARATUS OF RELAY USING THE SAME FREQUENCY BAND IN OFDM-BASED RADIO COMMUNICATION SYSTEM

(75) Inventors: Jae Young Ahn, Daejeon (KR); Young Jo Ko, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 395 days.

(21) Appl. No.: 13/059,002

(22) PCT Filed: Aug. 14, 2009

(86) PCT No.: PCT/KR2009/004564
§ 371 (c)(1),
(2), (4) Date: Feb. 14, 2011

(87) PCT Pub. No.: WO2010/019017
PCT Pub. Date: Feb. 18, 2010

(65) Prior Publication Data
US 2011/0143655 A1    Jun. 16, 2011

(30) Foreign Application Priority Data
Aug. 14, 2008   (KR) .................. 10-2008-0080126

(51) Int. Cl.
*H04B 7/15* (2006.01)
*H04B 1/60* (2006.01)
*H04B 3/36* (2006.01)

(52) U.S. Cl.
USPC ............. 455/11.1; 455/9; 455/7; 455/16

(58) Field of Classification Search
CPC .................................. H04B 7/15557
USPC ..................................... 455/7, 9, 16.15
See application file for complete search history.

(56) References Cited

U.S. PATENT DOCUMENTS

| | | | | |
|---|---|---|---|---|
| 5,691,978 A | * | 11/1997 | Kenworthy | 370/278 |
| 7,096,042 B2 | * | 8/2006 | Marinier | 455/562.1 |
| 7,733,813 B2 | * | 6/2010 | Shin et al. | 370/278 |
| 8,027,642 B2 | * | 9/2011 | Proctor et al. | 455/63.1 |
| 8,285,201 B2 | * | 10/2012 | Gore et al. | 455/11.1 |
| 2007/0155354 A1 | | 7/2007 | Piirainen | |

(Continued)

FOREIGN PATENT DOCUMENTS

| | | |
|---|---|---|
| EP | 1566900 A2 | 8/2005 |
| EP | 1848124 A1 | 10/2007 |

(Continued)

*Primary Examiner* — Tilahun B Gesesse
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a self-interference cancellation method and apparatus that may remove self-interference occurring when a transmission signal of a transmit antenna is received, directly or via a reflector, by a receive antenna in a relay using the same frequency band in an orthogonal frequency division multiplexing (OFDM)-based radio communication system.

8 Claims, 10 Drawing Sheets

(56) References Cited

U.S. PATENT DOCUMENTS

| | | |
|---|---|---|
| 2008/0108363 A1 | 5/2008 | Yu et al. |
| 2010/0284445 A1* | 11/2010 | Barriac et al. ............... 375/211 |
| 2010/0285733 A1* | 11/2010 | Gore et al. ...................... 455/7 |
| 2010/0285734 A1* | 11/2010 | Black et al. ..................... 455/7 |
| 2010/0285735 A1* | 11/2010 | Gore et al. ...................... 455/7 |
| 2010/0285736 A1* | 11/2010 | Gore et al. ...................... 455/7 |
| 2012/0300680 A1* | 11/2012 | Pietsch et al. ................ 370/279 |

FOREIGN PATENT DOCUMENTS

| | | |
|---|---|---|
| EP | 1855428 A2 | 11/2007 |
| JP | 2003-298548 | 10/2003 |
| KR | 1020080059407 | 6/2008 |
| WO | 2008/004916 A1 | 1/2008 |

* cited by examiner (a)

(b)

SELF-INTERFERENCE CANCELLATION METHOD AND APPARATUS OF RELAY USING THE SAME FREQUENCY BAND IN OFDM-BASED RADIO COMMUNICATION SYSTEM

RELATED APPLICATIONS

This application is a 35 U.S.C. §371 national stage filing of PCT Application No. PCT/KR2009/004564 filed on Aug. 14, 2009, which claims priority to, and the benefit of, Korean Patent Application No. 10-2008-0080126 filed on Aug. 14, 2008. The contents of the aforementioned applications are hereby incorporated by reference.

TECHNICAL FIELD

The present invention relates to a self-interference cancellation method and apparatus for a relay or a repeater using the same frequency band in an orthogonal frequency division multiplexing (OFDM)-based radio communication system. More particularly, the present invention relates to a self-interference cancellation method and apparatus that may estimate a self-interference channel between a transmit antenna and a receive antenna of a repeater or a relay by using self-interference that may occur when a transmission signal of the transmit antenna is received, directly or via a reflector, by the receive antenna, and may generate an estimated self-interference using the estimated self-interference channel, and may subtract the generated estimated self-interference from the received signal to thereby cancel the self-interference in the received signal.

BACKGROUND ART

FIG. 1 is a diagram for describing self-interference occurring in a relay 100 that transmits first data to a terminal 140 via a single transmit antenna, and receives second data from a base station 130 via a receive antenna, using the same frequency band.

Although description will be made based on a downlink of a radio communication system in FIG. 1, the present invention may be similarly applicable even to an uplink of the radio communication system.

Referring to FIG. 1, the relay 100 may transmit the first data to the terminal 140 using a transmit antenna 120. The relay 100 may receive the second data from the base station 130 using a receive antenna 110. Here, the relay 100 may use the same frequency band for the above transmission and reception.

The first data transmitted by the relay 100 using the transmit antenna 120 may be directly input into the receive antenna 110 as indicated by an arrow indicator 160. Also, as indicated by another arrow indicator 170, the first data may be reflected by a building 150 around the relay 100 to thereby be input into the receive antenna 110.

When the relay 100 transmits the first data and receives the second data using the same frequency band in the same time slot, the reflected and thereby received first data may become strong interference against the relay 100. Therefore, the relay 100 may not receive the second data. It is referred to as self-interference, which may be a major cause to deteriorate a data throughput.

DISCLOSURE OF INVENTION

Technical Goals

An aspect of the present invention provides a self-interference cancellation apparatus and method that may cancel self-interference of a relay using the same frequency band in a first link for transmitting data using a antenna(s), and in a second link for receiving data using another antenna(s).

Technical Solutions

According to an aspect of the present invention, there is provided a relay including: a transmitter to transmit a reference signal and first data using a transmit antenna(s); a receiver to receive a signal in which an estimated self-interference is subtracted from a received signal of a receive antenna(s), and to thereby restore second data; a self-interference channel estimation unit to estimate a self-interference channel between the transmit antenna(s) and the receive antenna(s) using the reference signal; an estimated self-interference generator to generate an estimated self-interference based on the estimated self-interference channel; and a self-interference cancellation unit to subtract the estimated self-interference from the received signal.

Advantageous Effect

According to embodiments of the present invention, it is possible to cancel self-interference of a relay or a repeater that may simultaneously perform transmission and reception in the same frequency band using two (or two groups) transceivers and antennas.

BEST MODE FOR CARRYING OUT THE INVENTION

Figure 1:
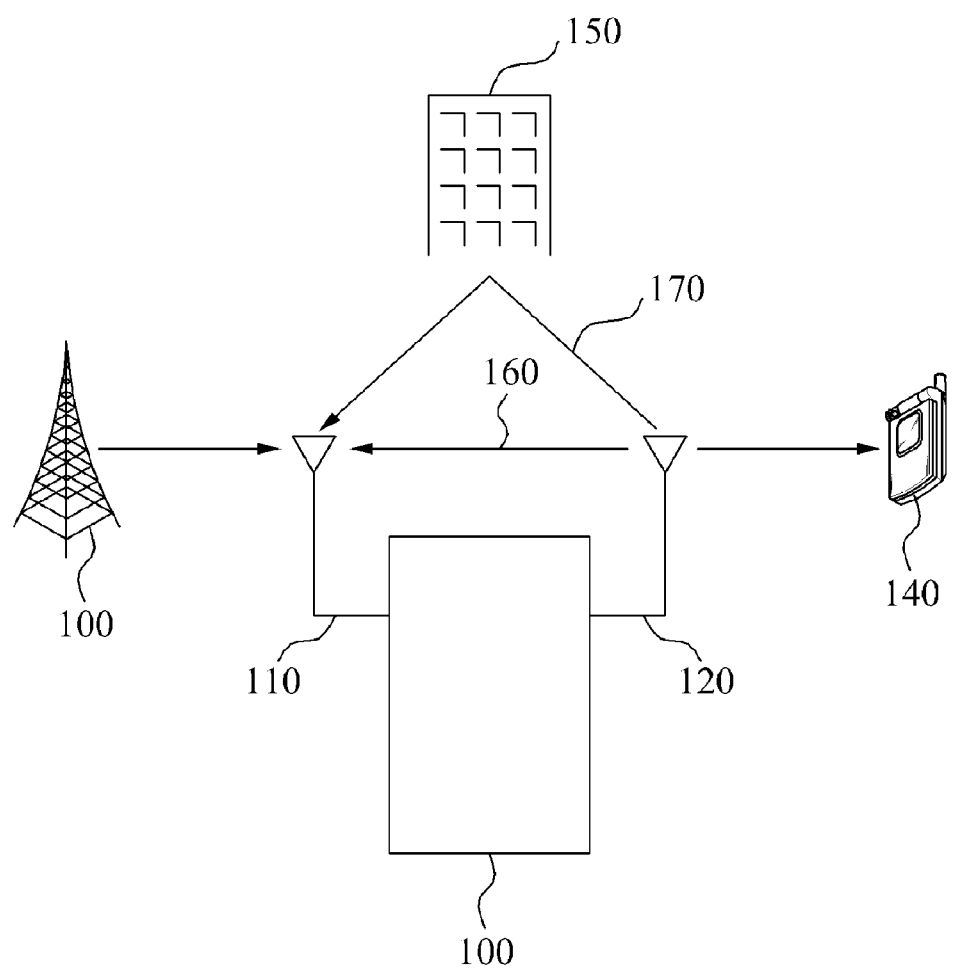
FIG. 1 is a diagram for describing self-interference occurring in a relay that transmits first data via a transmit antenna(s) and receives second data from a base station via a receive antenna(s)

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
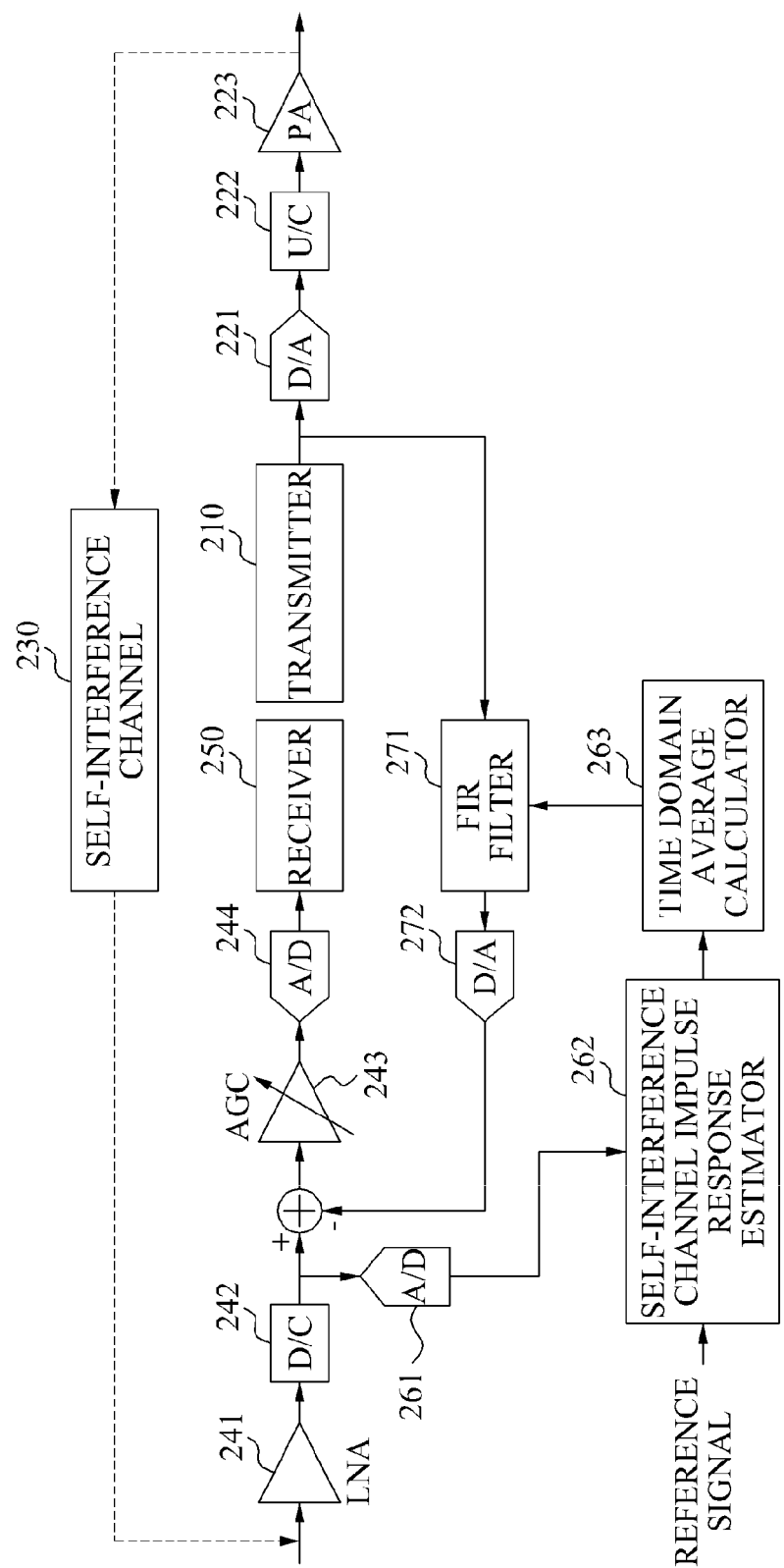
FIG. 2 is a diagram illustrating a structure of a relay to estimate a self-interference channel response in time domain using an open-loop scheme according to an embodiment of the present invention.

FIG. 2 is a diagram illustrating a structure of a relay to estimate a self-interference channel 230 in time domain using an open-loop scheme according to an embodiment of the present invention. Referring to FIG. 2, the relay may include a transmitter 210, a receiver 250, a self-interference channel impulse response estimator 262, a finite impulse response (FIR) filter 271, and the like.

The transmitter 210 may convert data to be transmitted by the relay, to a digital signal. A digital-to-analog (D/A) converter 221 may convert the digital signal to an analog signal. An up-converter 222 may convert the analog signal to a high frequency band signal. A power amplifier 223 may amplify the high frequency band signal to be readily transmittable.

The amplified high frequency band signal may be input into a receive antenna directly or reflectively from a transmit antenna. A channel between the transmit antenna and the receive antenna may be referred to as the self-interference channel 230. Hereinafter, a signal received using the receive antenna in such a manner that the data transmitted from the relay goes via the self-interference channel 230 is referred to as a self-interference.

The high frequency band signal input into the receive antenna may be amplified via a low noise amplifier (LNA) 241. A down-converter 242 may convert the high frequency band signal to a baseband signal.

An analog-to-digital (A/D) converter 261 may convert the analog signal to a digital signal. The self-interference channel impulse response estimator 262 may estimate an impulse response of the self-interference channel 230 in time domain using a reference signal and a received signal before subtraction.

The self-interference channel impulse response may vary over time. A time domain average calculator 263 may calculate the average of the self-interference channel impulse response in time domain and may set tap coefficients of the FIR filter 271. A transmission signal generated by the transmitter 210 may be input into the FIR filter 271 to generate an estimated self-interference that is similar to a self-interference. A D/A converter 272 may convert the estimated self-interference to an analog signal, and subtract the estimated-self-interference from the received signal, and thereby decrease an affect of the self-interference.

An automatic gain controller (AGC) 243 may control a gain of the received signal with the decreased self-interference signal. An A/D converter 244 may convert the gain-controlled received signal to a digital signal. The receiver 250 may receive the received signal with the decreased self-interference, and thereby may restore desired data.

Figure 3:
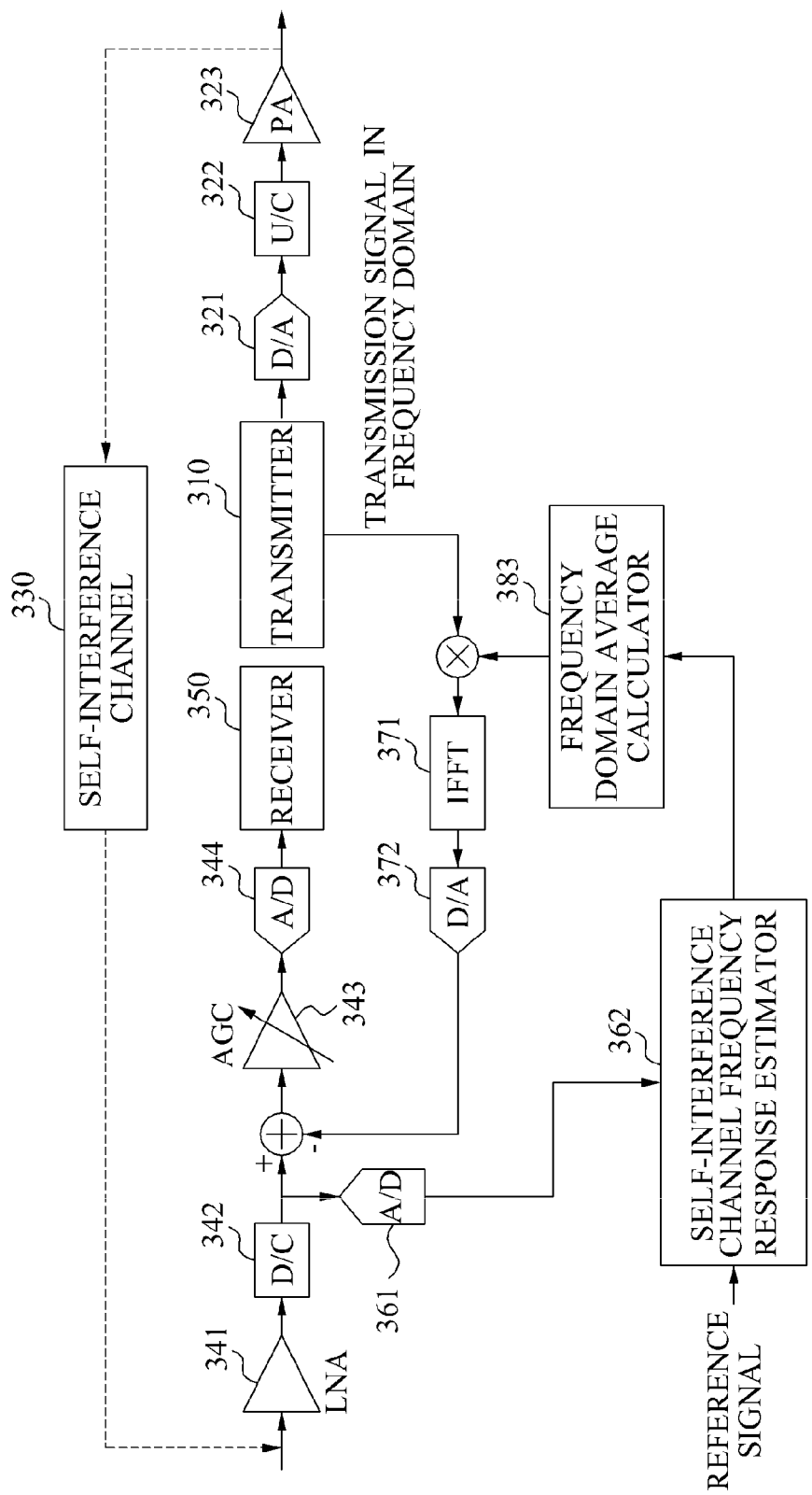
FIG. 3 is a diagram illustrating a structure of a relay to estimate a self-interference channel response in frequency domain using an open-loop scheme according to an embodiment of the present invention.

FIG. 3 is a diagram illustrating a structure of a relay to estimate a self-interference channel 330 in frequency domain using an open-loop scheme according to an embodiment of the present invention. Referring to FIG. 3, the relay may include a transmitter 310, a receiver 350, a self-interference channel frequency response estimator 362, a frequency domain average calculator 383, and the like. An operation of the relay of FIG. 3 will be similar to the aforementioned operation of the relay of FIG. 2. Thus, only operations of the self-interference channel frequency response estimator 362 and the frequency domain average calculator 383 will be described.

The self-interference channel frequency response estimator 362 may estimate a frequency response of the self-interference channel 330 in time domain using a reference signal and a received signal before subtraction. The frequency response may vary over time. The frequency domain average calculator 383 may calculate the average of the estimated self-interference channel frequency response.

An estimated self-interference in frequency domain may be generated by multiplying the self-interference channel frequency response and a transmission signal in frequency domain generated by the transmitter 310. The IFFT unit 371 may perform an IFFT for the estimated self-interference to convert the estimated self-interference in frequency domain to the estimated self-interference in time domain. It is possible to decrease an affect of the self-interference by subtracting the estimated self-interference from a received signal.

Figure 4:
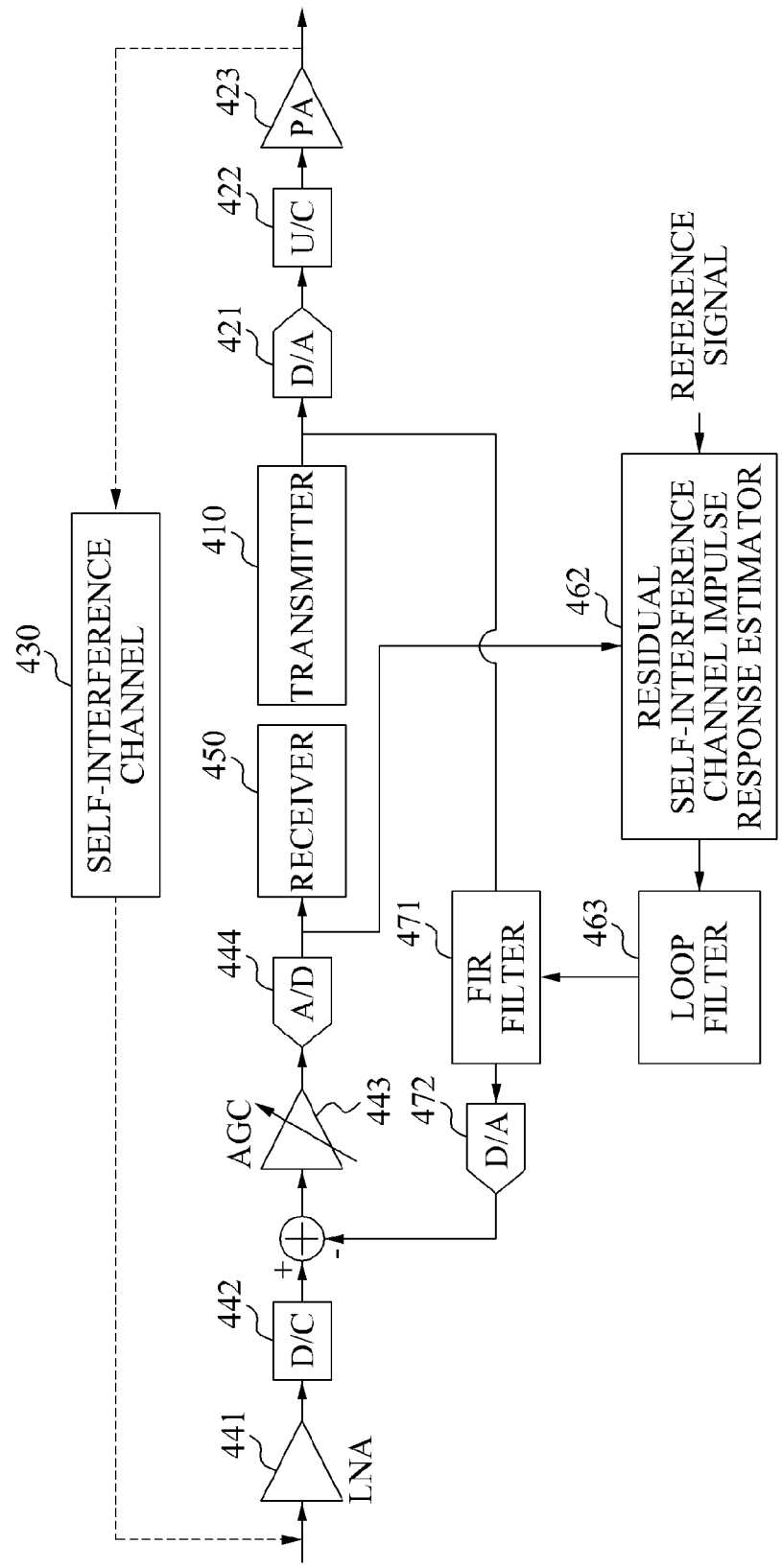
FIG. 4 is a diagram illustrating a structure of a relay to estimate a self-interference channel response in time domain using a closed-loop scheme according to an embodiment of the present invention.

FIG. 4 is a diagram illustrating a structure of a relay to estimate a self-interference channel 430 in time domain using a closed-loop scheme according to an embodiment of the present invention. Referring to FIG. 4, the relay may include a transmitter 410, a receiver 450, a residual self-interference channel impulse response estimator 462, a loop filter 463, and the like. An operation of the relay of FIG. 4 will be similar to the aforementioned operation of the relay of FIGS. 2 and 3. Thus, only operations of the residual self-interference channel impulse response estimator 462 and the loop filter 463 will be described here.

The result when an estimated self-interference channel impulse response is subtracted from a self-interference channel impulse response may be referred to as a residual self-interference channel impulse response.

A signal input into the receiver 450 may be a received signal with a decreased self-interference and thus may be a sum of a desired signal and a residual self-interference. The residual self-interference channel impulse response estimator 462 may estimate an impulse response of a residual self-interference channel using a reference signal and the same signal as the signal input into the receiver 450.

The loop filter 463 may calculate the averaged interference channel impulse response from consecutive residual self-interference channel impulse responses. Although the loop filter 463 is used to calculate the averaged interference channel impulse response in FIG. 3, it is possible to calculate it using a different scheme.

A FIR filter 471 may generate an estimated self-interference using the averaged self-interference channel impulse response and a transmission signal generated by the transmitter 410. A D/A converter 472 may convert the estimated self-interference to an analog signal.

According to an embodiment of the present invention, it is possible to decrease the self-interference by subtracting a residual estimated self-interference from a received signal.

Figure 5:
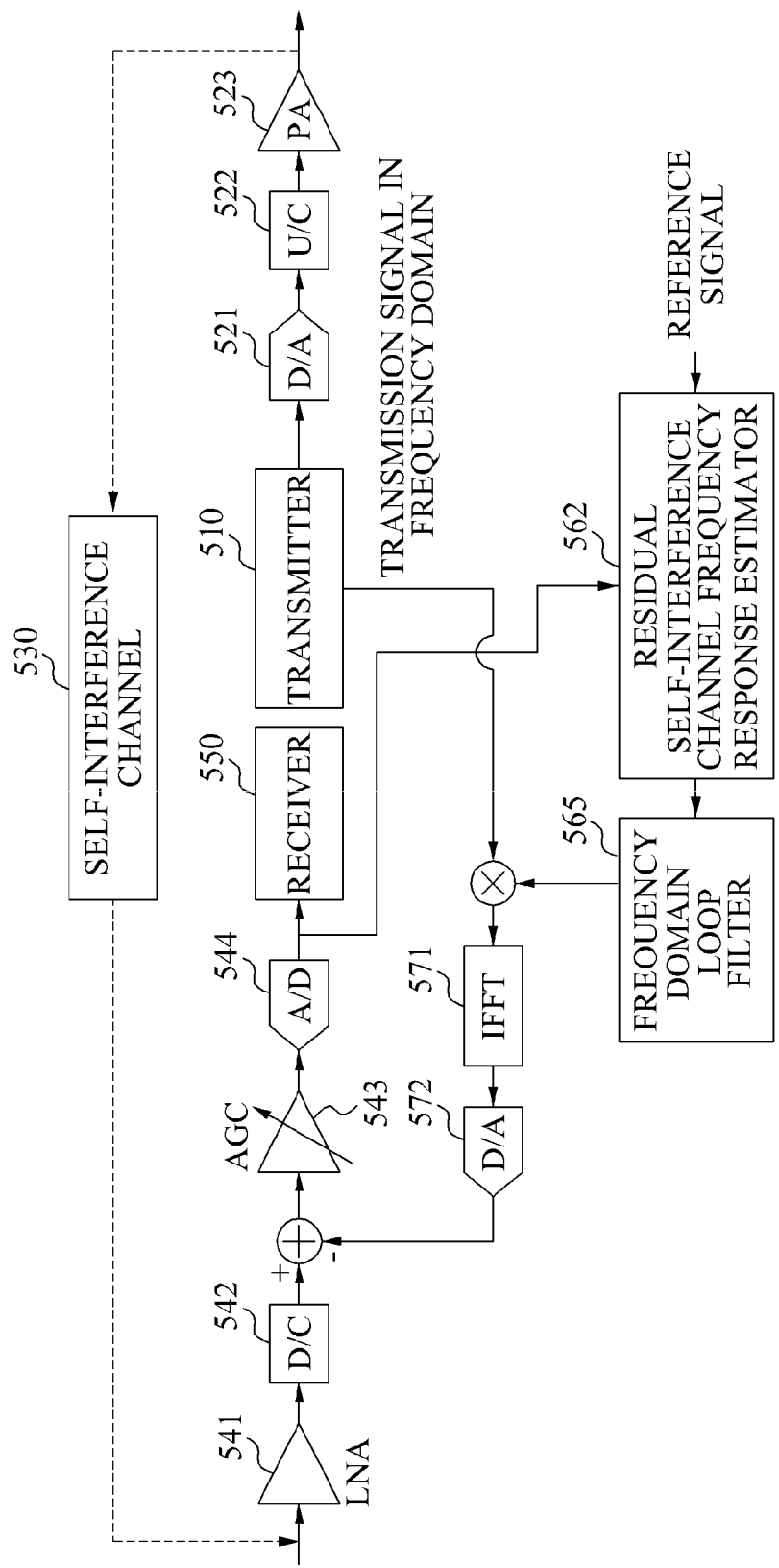
FIG. 5 is a diagram illustrating a structure of a relay to estimate a self-interference channel response in frequency domain using a closed-loop scheme according to an embodiment of the present invention.

FIG. 5 is a diagram illustrating a structure of a relay to estimate a self-interference channel 530 in frequency domain using a closed-loop scheme according to an embodiment of the present invention. Referring to FIG. 5, the relay may include a transmitter 510, a receiver 550, a residual self-interference channel frequency response estimator 562, a frequency domain loop filter 565, and the like. An operation of the relay of FIG. 5 will be similar to the aforementioned operation of the relay of FIGS. 2 through 4. Thus, only operations of the residual self-interference channel frequency response estimator 562 and the frequency domain loop filter 565 will be described here.

The result when an estimated self-interference channel frequency response is subtracted from a self-interference channel frequency response may be referred to as a residual self-interference channel frequency response.

The signal input into the receiver 550 may be a received signal with a decreased self-interference and thus may be a sum of a desired signal and a residual self-interference. The residual self-interference channel frequency response estimator 562 may estimate the residual self-interference channel frequency response using a reference signal and the same signal as the signal input into the receiver 550.

The frequency domain loop filter 565 may calculate the averaged self-interference channel frequency response from consecutive residual self-interference channel frequency responses.

An estimated self-interference in frequency domain may be generated by multiplying the averaged self-interference channel frequency response and a transmission data in frequency domain generated by the transmitter 510. An IFFT unit 571 may perform an IFFT for the estimated self-interference to convert the estimated self-interference in frequency domain to the estimated self-interference in time domain. It is possible to decrease the self-interference by subtracting the estimated self-interference from a received signal.

FIGS. 2 through 5 illustrate a configuration of generating an estimated self-interference using a reference signal of a transmitter. According to an embodiment of the present invention, in FIGS. 2 through 5, it is possible to estimate a self-interference channel using the entire transmission signal of a transmitter or a portion thereof instead of using a reference signal. In this case, it is possible to more accurately estimate a self-interference channel response and thereby generate a more accurate estimated self-interference.

In FIGS. 2 through 5, a self-interference cancellation is performed prior to an operation performed by an A/D converter. When a self-interference is stronger than a desired signal, a dynamic range of an analog signal may be significantly great due to the affect of the self-interference. Since a dynamic range of the desired signal excluding the self-interference is relatively small, the self-interference may decrease a number of effective bits of the A/D converter. Accordingly, when the self-interference is much stronger than the desired signal, it may be more effective to cancel self-interference in analog domain.

However, when the self-interference is not very strong in comparison to the desired signal, a decrease in the number of effective bits of the A/D converter may be insignificant. When the self-interference is cancelled in analog domain, there is an additional need for a D/A converter that may convert an estimated self-interference in digital domain to in analog signal. Accordingly, in this case, it may be more effective to cancel the self-interference in digital domain.

When a time division multiple access (TDMA) scheme is employed for the uplink, the self-interference cancellation technique described above with reference to FIGS. 2 through 5 may be applicable as is. However, when a frequency division multiple access (FDMA) scheme is used in the uplink, the signal that is transmitted from a relay to a base station, and is transmitted from a terminal to the relay may use consecutive or inconsecutive partial frequency bands. Therefore, in this case, a self-interference channel response or a residual self-interference channel response may need to be estimated in a time slot where a transmitter performs transmission, using only the partial frequency bands instead of the entire frequency band.

Figure 6:
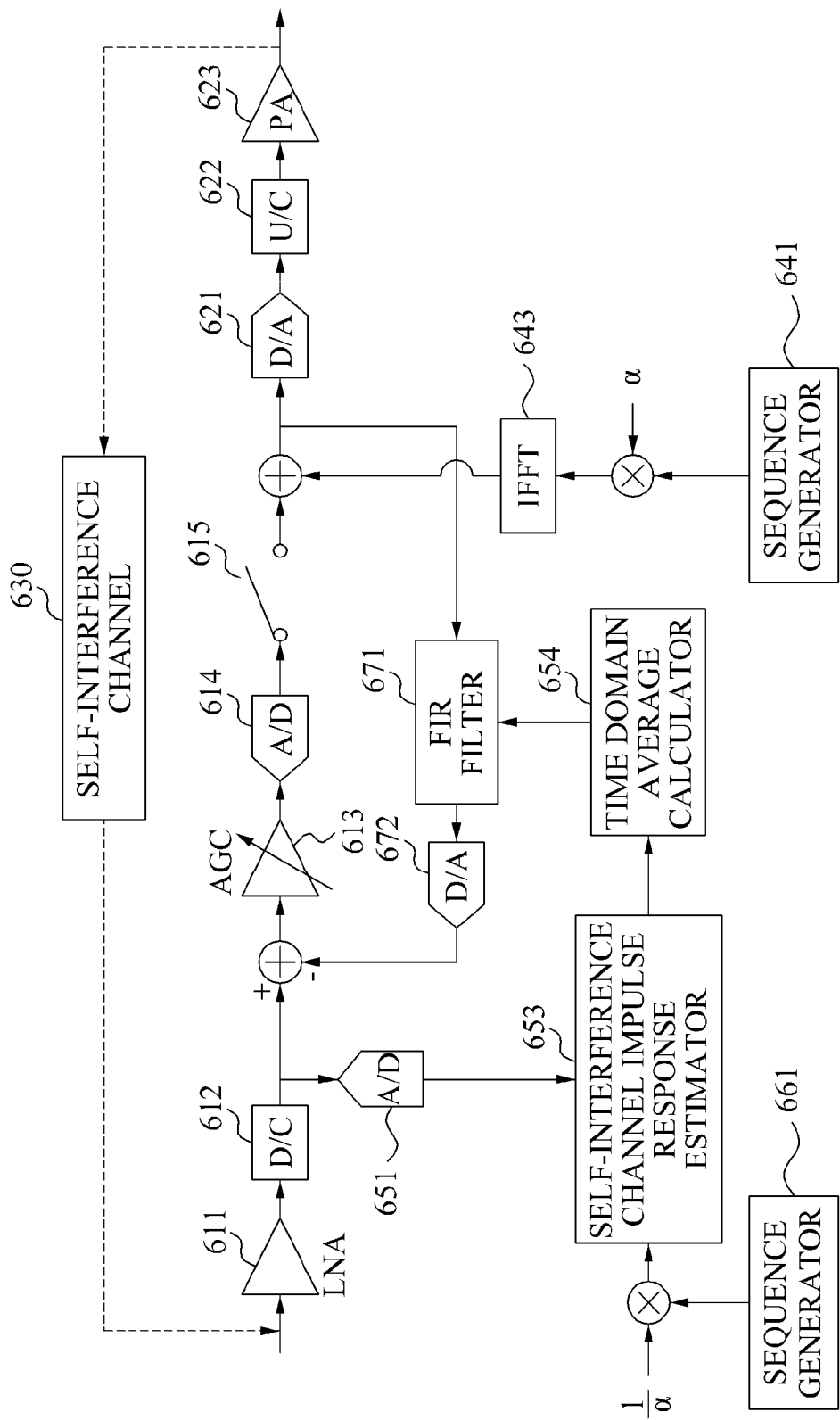
FIG. 6 is a diagram illustrating a structure of a repeater to subtract a self-interference by generating estimated self-interference according to an embodiment of the present invention

FIG. 6 is a diagram for describing a repeater to generate an estimated self-interference in time domain, and to cancel self-interference according to an embodiment of the present invention. Referring to FIG. 6, the repeater may include an impulse response estimator 653, a FIR filter 671, and the like.

To effectively estimate an impulse response of a self-interference channel 630, the repeater may perform an IFFT for a sequence from a sequence generator 641 using an IFFT 643. Here, the inverse Fourier transformed sequence may be referred to as a reference signal for an estimation of an interference channel response. A D/A converter 621 may convert, to an analog signal, the inverse Fourier transformed sequence added up with a received signal in which self interference is cancelled. An up-converter 622 may convert the analog signal to a high frequency band signal. A power amplifier 623 may amplify the high frequency band signal to be readily transmittable.

The high frequency band signal received via a receive antenna may be amplified via a LNA 611. A down-converter 612 may convert the high frequency band signal to an analog signal of the baseband.

An A/D converter 651 may convert the analog signal of the baseband to a digital signal. The self-interference channel impulse response estimator 653 may estimate the impulse response of the self-interference channel 630 using a sequence from a sequence generator 661. The sequence generator 661 may generate the same sequence as the sequence of the sequence generator 641. A time domain average calculator 654 may calculate the average of the estimated self-interference channel impulse response in time domain.

The FIR filter 671 may generate an estimated self-interference using the average of the estimated self-interference channel impulse response and the sum of the inverse fast Fourier transformed sequence and the received signal in which self interference is cancelled. An A/D converter 672 may convert the estimated self-interference to an analog signal. It is possible to decrease an affect of the self-interference by subtracting the estimated self-interference from a received signal.

Examples of a scheme of generating a reference signal for a self-interference channel response estimation may include i) a scheme of generating a self-interference reference signal, which is synchronized in time and frequency with a demodulation reference signal of a received signal, using a demodulation reference signal sequence for other cell, ii) a scheme of generating the self-interference reference signal, which is synchronized in time and frequency with a demodulation reference signal of a received signal, using a sequence having a smallest correlation with a demodulation reference signal sequence of the corresponding cell, iii) a scheme of continuously generating the self-interference reference signal in every OFDM symbol, which is synchronized in time and frequency with a received signal, using a specific sequence, and the like.

When an initialization is performed, the repeater may disconnect a connection between a receiver and a transmitter parts using a switch 615, transmit only a self-interference reference signal for a self-interference channel estimation, and estimate an impulse response of the self-interference channel 630 using the self-interference reference signal. When the self-interference may be effectively cancelled, the receiver and transmitter parts are connected to each other using the switch 615, and the repeater is converted to a normal operation state.

A downlink reference signal of many radio communication systems such as a $3^{rd}$ Generation Partnership Project Long Term Evolution (3GPP LTE) system may be designed to have a predetermined pattern in frequency domain and/or the time domain. When the above reference signal pattern is used, it is possible to further enhance a self-interference cancellation performance of the repeater.

Figure 7:
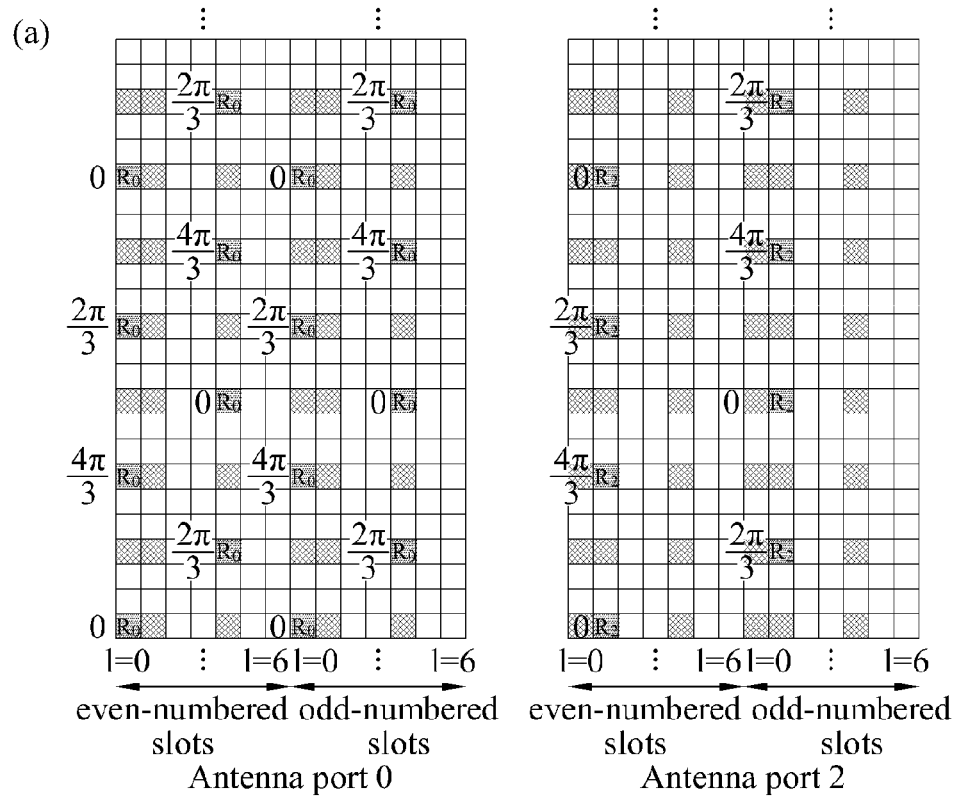
FIG. 7 illustrates an example of generating, by a repeater, a reference signal for estimating self-interference in a downlink according to an embodiment of the present invention.
Figure 7:
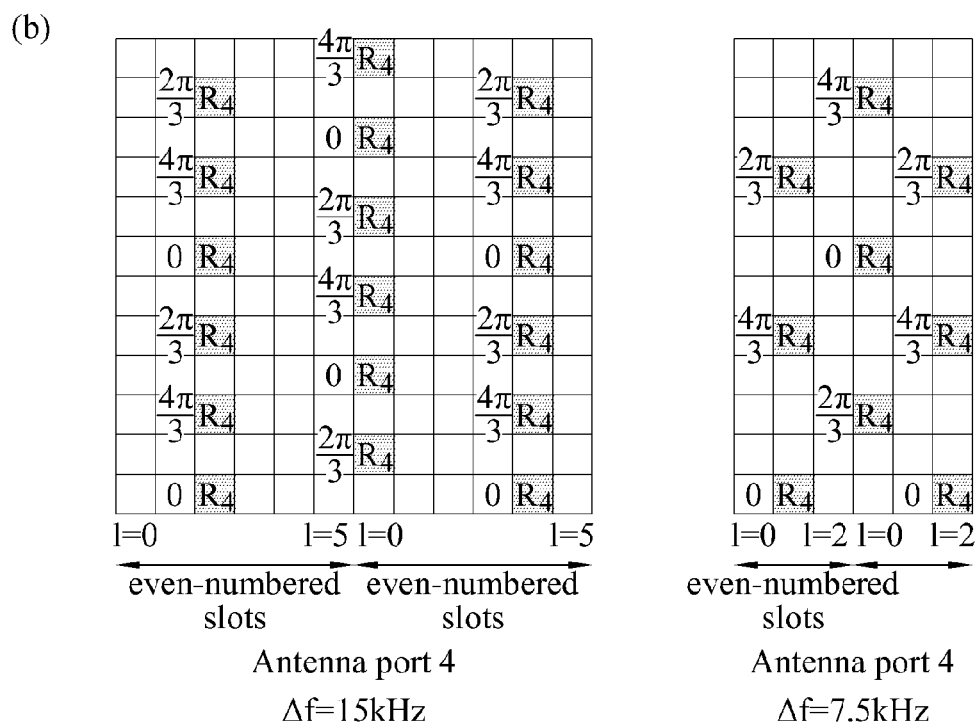

FIG. 7 illustrates examples of generating, by a repeater, a self-interference reference signal in a downlink according to an embodiment of the present invention. The self-interference reference signal may be located in the same frequency and time domain as a downlink reference signal. A cell specific reference signal or an MBSFN reference signal may be used for the downlink reference signal. A sequence for generating the self-interference reference signal may be generated by multiplying the downlink reference signal sequence and an orthogonal sequence of a particular pattern with a period 3.

The orthogonal sequence may be generated so that a phase difference between adjacent reference signal subcarriers in a OFDM symbol is $$\frac{4}{3} \cdot \pi,$$

and a phase difference between a reference signal subcarrier of a OFDM symbol and the reference signal subcarrier adjacent to it in frequency domain of the neighboring OFDM symbol including reference signal may be $$\frac{2}{3} \cdot \pi.$$

Figure 8:
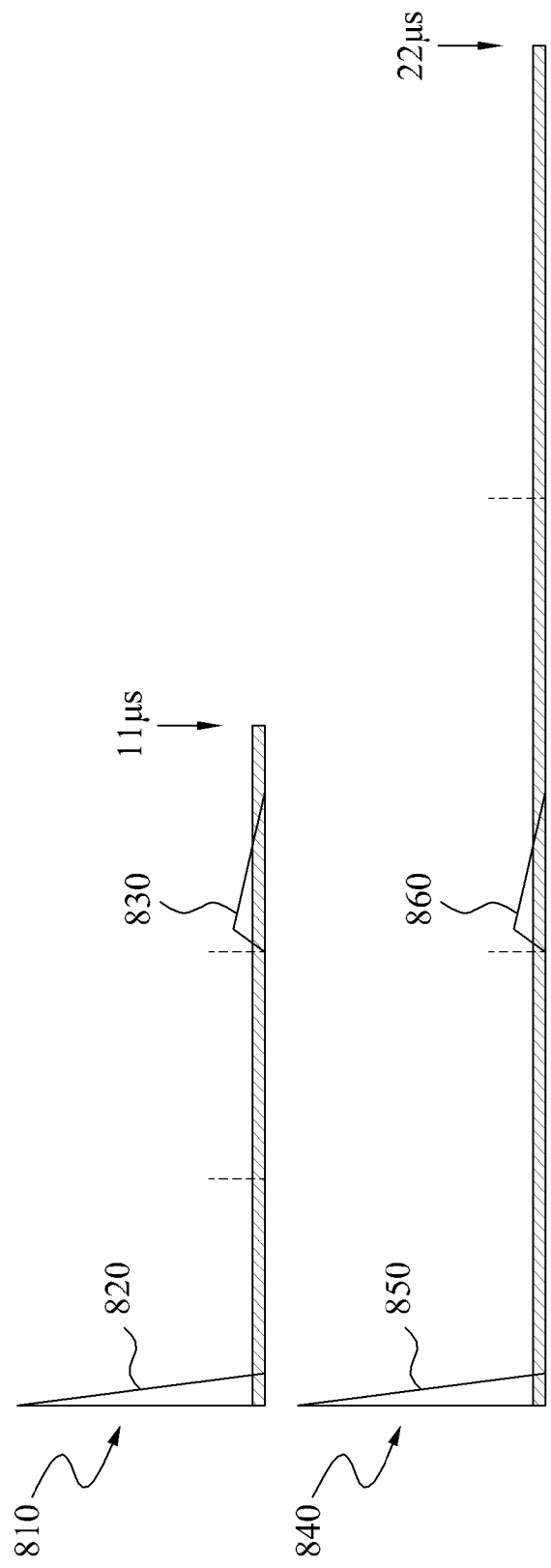
FIG. 8 illustrates an output of an impulse response estimator with respect to a self-interference channel when using a cell specific reference signal sequence for estimating self-interference according to an embodiment of the present invention.

FIG. 8 illustrates an output of an impulse response estimator with respect to a self-interference channel when using a cell specific self-interference reference signal sequence according to an embodiment of the present invention. A diagram 810 shows a case where only a self-interference reference signal included in a single OFDM symbol is used. A diagram 840 shows a case where two neighboring OFDM symbols including reference signal are simultaneously used. In the diagrams 810 and 840, impulse responses 820 and 850 of a self-interference channel initially appear, and impulse responses 830 and 860 of a channel between a transmitter of a base station and a receiver of a repeater appear behind. When only a front portion is selected in time domain, only an impulse response of the self-interference channel and a noise component may remain. Accordingly, no performance deterioration may occur due to a received signal from the base station.

Figure 9:
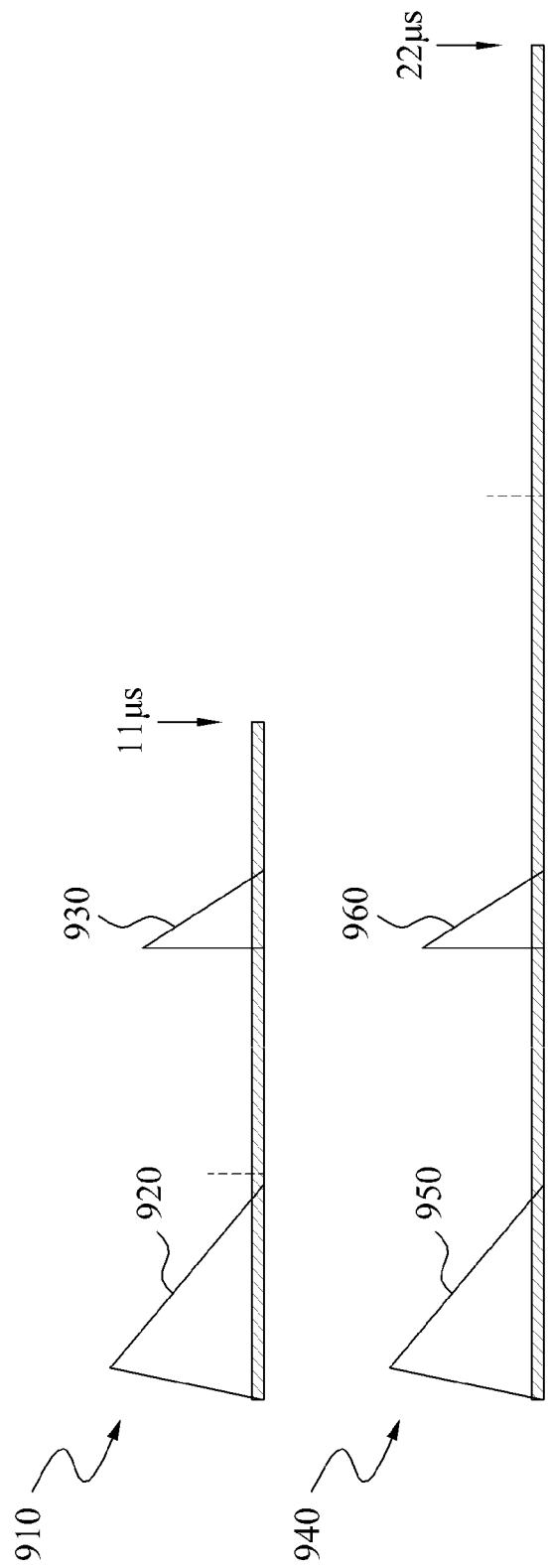
FIG. 9 illustrates an impulse response of a terminal reception channel via a repeater when using a cell specific reference signal sequence for estimating self-interference according to an embodiment of the present invention.

FIG. 9 illustrates an impulse response of a terminal reception channel via a repeater when using a cell specific self-interference reference signal sequence according to an embodiment of the present invention. A diagram 910 shows a case where only a self-interference reference signal included in a single OFDM symbol is used. A diagram 940 shows a case where two neighboring OFDM symbols including reference signal are simultaneously used. In the diagrams 910 and 940, impulse responses 920 and 950 of a channel between a transmitter of a base station and a receiver of a terminal initially appear, and impulse responses 930 and 960 of a channel between a transmitter of a repeater and the receiver of the terminal appear behind.

When only a front portion is selected in time domain, only an impulse response of the channel between the base station and the terminal, and a noise component may remain. Accordingly, no performance deterioration may occur due to a self-interference reference signal transmitted from the relay.

Figure 10:
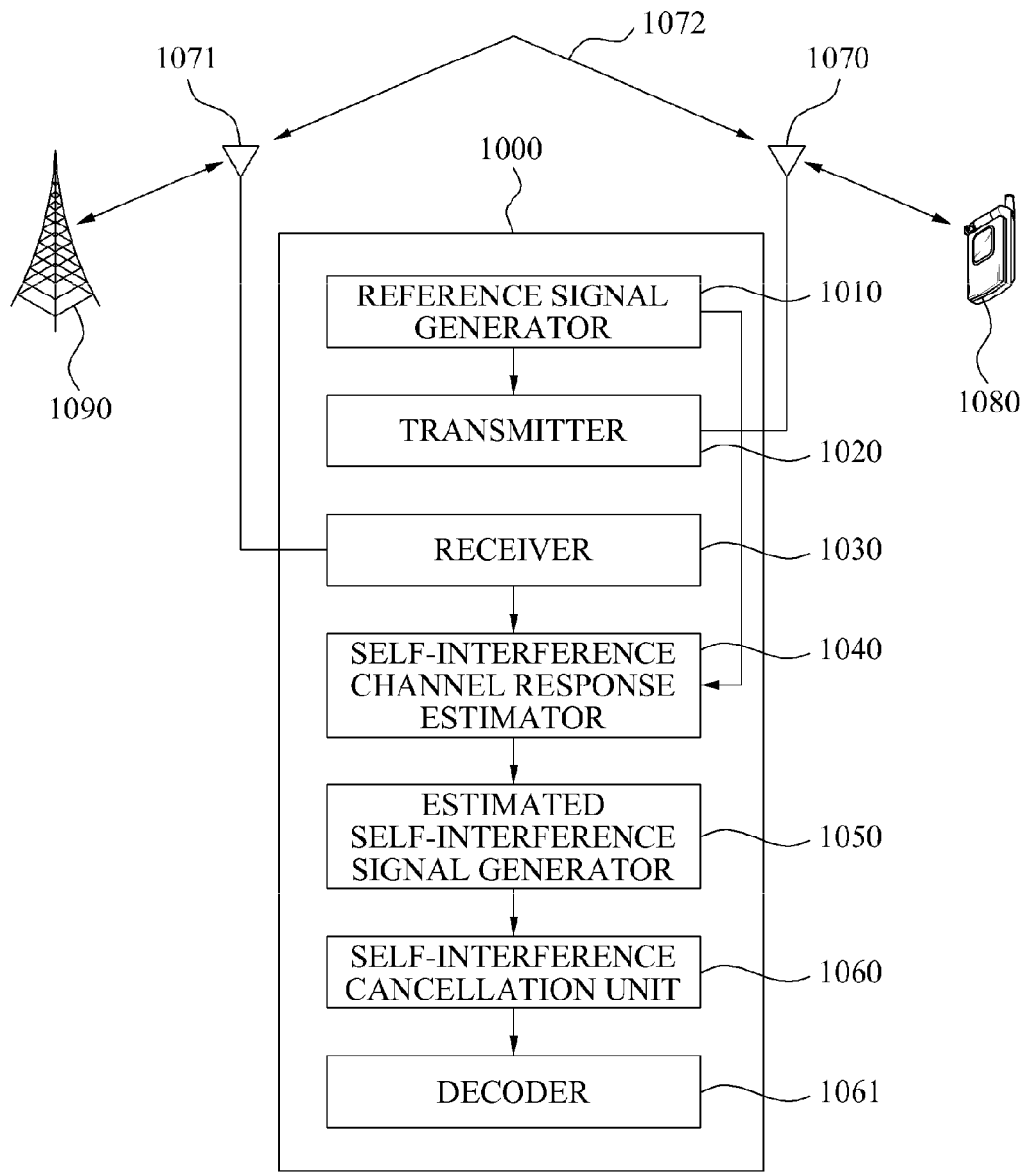
FIG. 10 is a block diagram illustrating a structure of a relay according to an embodiment of the present invention.

FIG. 10 is a block diagram illustrating a structure of a relay 1000 according to an embodiment of the present invention. Referring to FIG. 10, the relay 1000 may include a reference signal generator 1010, a transmitter 1020, a receiver 1030, a self-interference channel response estimator 1040, an estimated self-interference generator 1050, and a self-interference cancellation unit 1060.

The reference signal generator 1010 may generate a self-interference cancellation reference signal. Depending on embodiments, the reference signal generator 1010 may be provided within the transmitter 1020.

According to an embodiment of the present invention, the relay 1000 may transmit first data to a terminal 1080 using a downlink or to a base station 1090 using an uplink.

The transmitter 1020 may transmit data and the self-interference cancellation reference signal using a transmit antenna 1070. A transmitted signal may be input into a receive antenna 1071 via a self-interference channel 1072.

The receiver 1030 may receive the self-interference using the receive antenna 1071. Also, the receiver 1030 may receive second data from the base station 1090 in the downlink or from the terminal 1080 in the downlink.

The self-interference channel response estimator 1040 may estimate the self-interference channel 1072 between the transmit antenna 1070 and the receive antenna 1071, using the received signal and the reference signal. The self-interference channel response estimator 1040 may estimate an impulse response or a frequency response of the self-interference channel 1072.

The estimated self-interference generator 1050 may generate an estimated self-interference based on the estimated self-interference channel response. The estimated self-interference may be similar to a self-interference via the self-interference channel 1072.

The self-interference cancellation unit 1060 may cancel the estimated self-interference from the received signal.

A decoder 1061 may decode the second data in the received signal in which the estimated self-interference is cancelled.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:
1. A self-interference cancellation apparatus comprising:
   a channel estimator estimating a radio channel between a transmit antenna of a relay and a receive antenna of the relay;
   an estimated self-interference generator generating an estimated self-interference based on an estimated radio channel; and
   a self-interference cancellation unit canceling the estimated self-interference in a received signal received via the receive antenna,
   wherein the relay transmits data and comprises:
      a reference signal generator configured to generate self-interference cancellation reference signal and an uplink reference signal, generating the uplink reference signal using an uplink reference signal sequence that is selected from a reference signal sequence group including a plurality of reference signal sequences, for the base station to perform a coherent demodulation, and a transmitter to transmit the self-interference cancellation reference signal, the data, and the uplink reference signal to a base station accessing the relay, and wherein the channel estimator receives the self-interference cancellation reference signal and estimates a radio channel based on the received self-interference cancellation reference signal.

2. The apparatus of claim 1, wherein the relay transmits data using a plurality of frequency bands, and comprises:

a transmitter to transmit the self-interference cancellation reference signal using the transmit antenna and a first frequency band included in the plurality of frequency bands, and the channel estimator receives the self-interference cancellation reference using the receive antenna, and estimates a radio channel of a second frequency band among the plurality of frequency bands based on the received self-interference cancellation reference signal.

3. The apparatus of claim 1, wherein the reference signal generator selects a self-interference cancellation reference signal sequence from reference signal sequences excluding the uplink reference signal sequence, and generates the self-interference cancellation reference signal using the self-interference cancellation reference signal sequence.

4. The apparatus of claim 1, wherein the self-interference cancellation reference signal sequence and the uplink reference signal sequence are orthogonal to each other.

5. A self-interference cancellation apparatus transmitting first data to a base station using a plurality of frequency bands, the apparatus comprising:

a reference signal generator generating a self-interference cancellation reference signal, wherein the reference signal generator generates an uplink reference signal using an uplink reference signal sequence that is selected from a reference signal sequence group including a plurality of reference signal sequences;

a transmitter transmitting the self-interference cancellation reference signal using a transmit antenna and a first frequency band among the plurality of frequency bands wherein the transmitter transmits the uplink reference signal and the first data to the base station, and the uplink reference signal is used to perform a coherent demodulation for the first data;

a receiver receiving the self-interference cancellation reference signal using a receive antenna, to receive second data from the base station, and to generate a received signal;

a channel estimator estimating a channel of the first frequency band between the transmit antenna and the receive antenna, based on the self-interference cancellation reference signal;

an estimated self-interference generator generating an estimated self-interference based on an estimated radio channel of the first frequency band; and a self-interference cancellation unit canceling the estimated self-interference in the received signal.

6. The apparatus of claim 5, further comprising:

a decoder, wherein the channel estimator estimates a channel of a second frequency band among the plurality of frequency bands based on the self-interference cancellation reference signal, and the decoder decodes the second data using the estimated channel of the second frequency band.

7. The apparatus of claim 5, wherein the reference signal generator selects a self-interference cancellation reference signal sequence from reference signal sequences excluding the uplink reference signal sequence, and generates the self-interference cancellation reference signal using the self-interference cancellation reference signal sequence.

8. The apparatus of claim 7, wherein the self-interference cancellation reference signal sequence and the uplink reference signal sequence are orthogonal to each other.

* * * * *